United States Patent

[11] 3,632,186

[72] Inventor David Kahn
Yellowbrook Road, R.D. 2, Box 59,
Farmingdale, N.J. 07727
[21] Appl. No. 69,838
[22] Filed Sept. 4, 1970
[45] Patented Jan. 4, 1972

[54] CLOSEUP STEREOSCOPIC SLIDE VIEWER
5 Claims, 5 Drawing Figs.

[52] U.S. Cl. .................................................. 350/133
[51] Int. Cl. ............................................ G02b 27/22
[50] Field of Search ........................................ 350/133,
241, 247, 181

[56] References Cited
UNITED STATES PATENTS
270,907 1/1883 McCausland ................. 350/241
3,298,771 1/1967 Rattiff, Jr. .................... 350/197

*Primary Examiner*—David Schonberg
*Assistant Examiner*—Paul A. Sacher
*Attorney*—Hane, Baxley and Spiecens ABSTRACT: There is disclosed a slide viewer wherein a slide is interposed in a housing supporting a viewing lens and a translucent window. Movably supported between the viewing lens and the slide is an enlarging lens which is movable over different regions of the slide for obtaining enlarged views of portions of the slide.

PATENTED JAN 4 1972 3,632,186
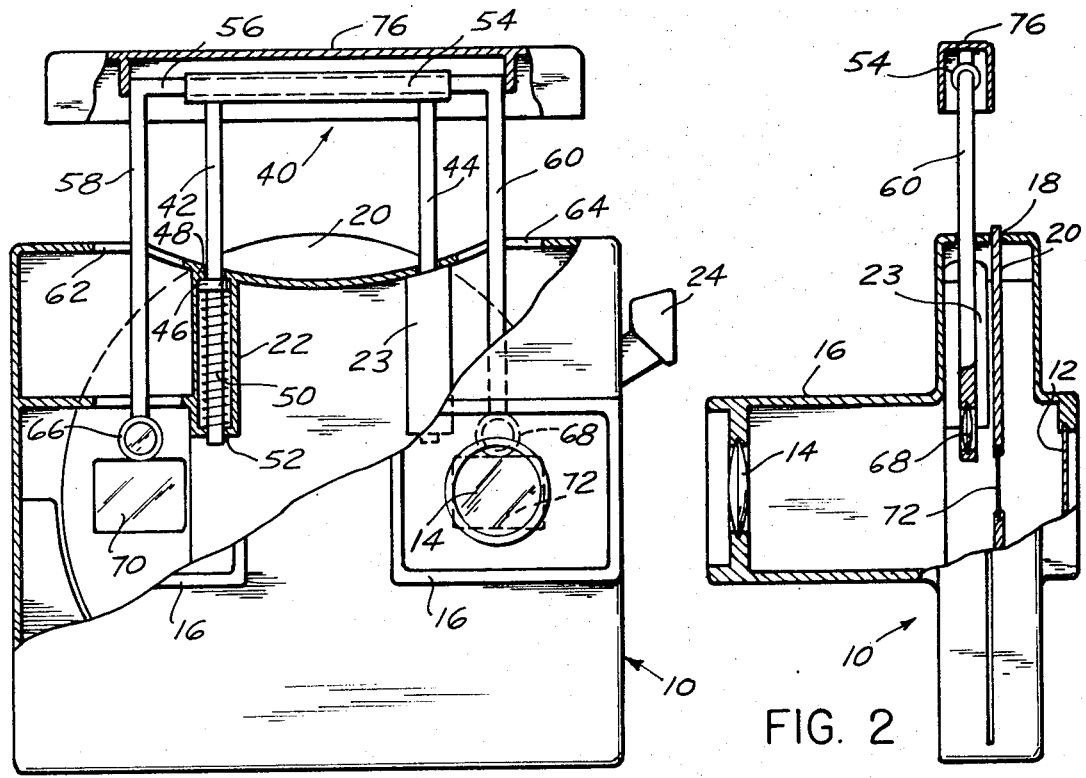
FIG. 1
FIG. 2
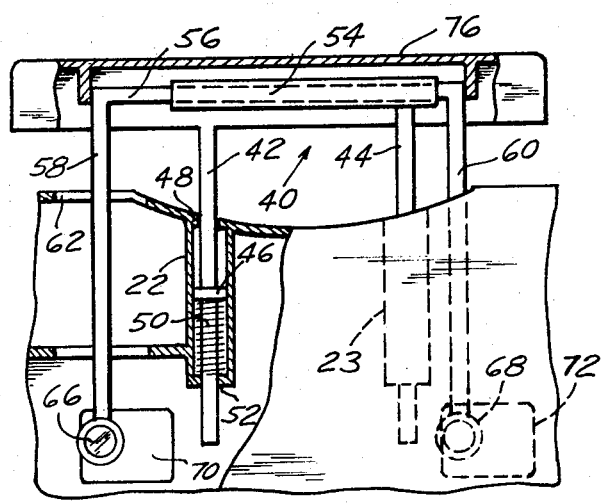
FIG. 4
FIG. 3
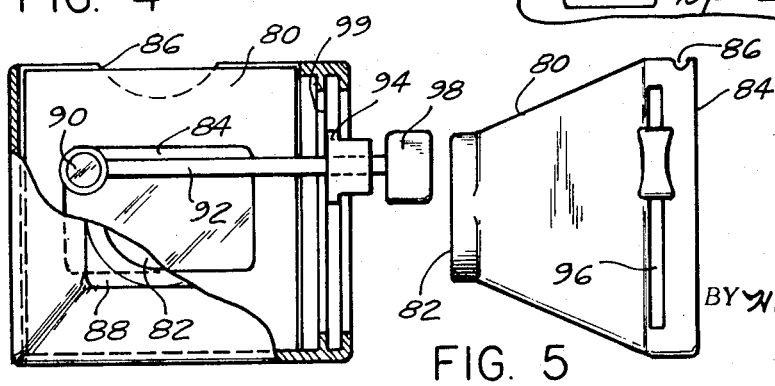
FIG. 5
INVENTOR.
DAVID KAHN
BY Hane, Baxley and Spiecens
ATTORNEYS

CLOSEUP STEREOSCOPIC SLIDE VIEWER

This invention pertains to slide viewers and, more particularly, to such viewers which provide selective magnification.

Present hand viewers for photographic slides provide very weak magnification. However, there is often the need to provide closeup viewing of the slide to study the details of the scene being viewed. At present, when this situation arises it is necessary to remove the slide from the viewer and place it in a projector.

It is, accordingly, a general object of the invention to increase the versatility of slide viewers by enabling a person to selectively enlarge areas of the slide so as to view closeups.

Another object of the invention is to enable the user of a stereoscopic viewer to maintain the depth illusion effect while selectively viewing areas of stereoscopic slides in enlarged detail.

Briefly, the invention contemplates a slide viewer comprising a housing with a translucent window at one end and a viewing lens in the end of the housing opposite the translucent window: an opening in the housing acting as a slide guide is located between the ends of the housing to position the slide between the viewing lens and the translucent window. A movable enlarging lens is movably positioned between the viewing lens and the slide guide to permit a user to view in closeup selected portions of a slide. Other objects, the features and advantages of the invention will be apparent from the following detailed description of the invention when read with the accompanying drawings, wherein:

FIG. 1 is a users end view of a stereoscopic slide viewer, with portions of the housing broken away, in accordance with one embodiment of the invention;

FIG. 2 is a side view of the slide viewer of FIG. 1;

FIG. 3 shows the enlarging lenses support member in an operative position;

FIG. 4 shows a monocular viewer in accordance with another embodiment of the invention; and FIG. 5 shows a side view of the viewers of FIG. 4.

The stereoscopic viewer shown in FIGS. 1–3 comprises a housing 10 supporting a translucent window 12 and a pair of spaced viewing lenses 14 (only one of which is shown). The viewing lenses 14 are supported by rectangular tubes 16. A slot 18 in the top of housing 10 accepts a slide carrier 20. The outer wall of cylinder housings 22 and 23 guide the carrier 20 to its proper optical position from viewing lens 14. The slide carrier 20 is rotated from position to position by depressing knob 24. Since the rotating mechanism does not form part of the invention, it will not be described. However, a suitable mechanism is described in U.S. Pat. No. 2,511,334. The viewer, as so far described, can be used for conventional stereoscopic viewing.

In order to obtain closeup viewing an enlargement lens carrying mechanism 40 is included in the viewer. In particular, a pair of spring loaded upright rods 42 and 44 extend from cylinder housings 22 and 23, respectively. Since the rods and housings combinations are identical, only one will be described. Rod 42 is provided with an intermediate collar 46 which cooperates with stop 48 to limit upward travel of rod 42. Disposed about the portion of rod 42 in housing 22 is a helical spring 50. Spring 50 is maintained under compression between collar 46 and the base of housing 22. Thus, rod 42 is biased to its maximum retracted position as shown in FIG. 1. However, the base of housing 22 is provided with a hole 52 through which the bottom of rod 42 can pass. Therefore, any downward pressure on rod 42 will cause it to travel freely downward against the bias of spring 50.

The upper ends of rods 42 and 44 support a horizontal tube 54. Freely movable through tube 54 is the crossarm 56 of a lens carrier. Downwardly extending from each end of crossarm 56 and integral therewith are arms 58 and 60. Each of the arms passes through one of the elongated slots 62 and 64 in the housing 10. The free end of each of the rods 58 and 60 carry enlarging lenses 66 and 68.

The enlarging lenses 66 and 68 are positioned in a plane in front of the pair of slides 70 and 72, i.e., between the slides and the viewing lenses 14. It should be noted that enlarging lenses 66 and 68 are smaller than the surface areas of the slides so as to obtain closeup details of portions of the slides. The portions of the slides are selected by moving handle 76 connected to crossarm 56. A downward movement of handle 76 will move the enlarging lenses 66 and 68 across the slides while a lateral movement of handle 76 will move the enlarging lenses 66 and 68 horizontally over the slides 70 and 72. See FIG. 3 for the results of a downward and leftward movement of handle 76. When the downward pressure on handle 76 is removed, the lenses 66 and 68 are withdrawn from over the slides as shown in FIGS. 1 and 2.

In FIGS. 4 and 5, there is shown a monocular viewer in accordance with another embodiment of the invention. The viewer includes a housing 80 having a viewing lens 82 at one end and a translucent window 84 at the other end. A slot 86 in the top of the housing permits insertion of a slide 88. Positioned between slide 88 and viewing lens 82 is an enlarging lens 90 carried on one end of rod 92 which passes through bushing 94 and slot 96 in the side of housing 80 to knob 98. Thus, lens 90 can be horizontally moved across the slide. To provide vertical freedom of movement bushing 94 is frictionally slidable between rib 99 and the wall containing slot 96.

While only a limited number of embodiments have been shown and described in detail, there will now be obvious to those skilled in the art many modifications and variations satisfying many or all of the objects of the invention but which do not depart from the spirit thereof as defined by the appended claims.

What is claimed is:

1. A stereoscopic viewer comprising a housing, a pair of viewing lenses laterally spaced in one end of said housing, at least one translucent window in the other end of said housing opposite said viewing lenses, a slotted opening in said housing through which a slide can pass, means for positioning a pair of slides opposite said viewing lenses in such a way that each slide is viewable from a different viewing lens, a pair of enlarging lenses, and supporting means passing through said housing for mutually supporting each of said enlarging lens between one of said viewing lenses and one of the slides, said support means being movable for moving said enlarging lenses opposite different portions of the slides.

2. The stereoscopic viewer of claim 1 wherein said means for supporting said enlarging lenses comprises a mechanical linkage movable in two orthogonal directions.

3. The stereoscopic viewer of claim 2 wherein said mechanical linkage comprises two parallel upright members slidably supported by said housing, a hollow horizontal tube connected to an end of each of said upright members, a crossarm member slidably positioned in said horizontal tube, and a pair of arms downwardly extending from the respective ends of said crossarm member, each of said enlarging lens being connected to the end of a different one of the downwardly extending arms.

4. The stereoscopic viewer of claim 3 further comprising means for biasing said mechanical linkage to a position whereby said enlarging lenses are not over the slides.

5. The stereoscopic viewer of claim 5 wherein said biasing means comprises at least one spring under compression between a fixed element on said housing and a collar on one of said upright rods.

* * * * *